United States Patent
Wang et al.

(10) Patent No.: US 11,468,612 B2
(45) Date of Patent: *Oct. 11, 2022

(54) CONTROLLING DISPLAY OF A MODEL BASED ON CAPTURED IMAGES AND DETERMINED INFORMATION

(71) Applicant: Beijing Sensetime Technology Development Co., Ltd., Beijing (CN)

(72) Inventors: Min Wang, Beijing (CN); Wentao Liu, Beijing (CN); Chen Qian, Beijing (CN); Lizhuang Ma, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,373

(22) Filed: Nov. 23, 2020

(65) Prior Publication Data
US 2021/0074006 A1 Mar. 11, 2021

Related U.S. Application Data

(63) Continuation of application No. PCT/CN2020/072550, filed on Jan. 16, 2020.

(30) Foreign Application Priority Data

Jan. 18, 2019 (CN) .......................... 201910049830.6
Apr. 30, 2019 (CN) .......................... 201910363858.7

(51) Int. Cl.
*G06T 11/60* (2006.01)
*G06T 7/73* (2017.01)
(Continued)

(52) U.S. Cl.
CPC ............ *G06T 11/60* (2013.01); *G06T 7/0014* (2013.01); *G06T 7/246* (2017.01); *G06T 7/73* (2017.01);
(Continued)

(58) Field of Classification Search
None
See application file for complete search history.

(56) References Cited

U.S. PATENT DOCUMENTS 4,561,066 A 12/1985 Emmons et al.
6,657,628 B1 12/2003 Cook
(Continued)

FOREIGN PATENT DOCUMENTS

CN 101930284 A 12/2010
CN 102824176 A 12/2012
(Continued)

OTHER PUBLICATIONS

State Intellectual Property Office of the People's Republic of China, Office Action and Search Report Issued in Application No. 201910365188.2, dated Jul. 9, 2021, 29 pages.
(Continued)

*Primary Examiner* — Edward Martello

(57) ABSTRACT

Embodiments of the present disclosure disclose an image processing method and apparatus, an image device, and a storage medium. The image processing method includes: obtaining an image; obtaining first rotation information of each of multiple nodes of a target; determining second rotation information of each child node with respect to a parent node in the multiple nodes of the target according to a hierarchical relationship among the nodes and multiple pieces of the first rotation information; and controlling movements of nodes in a controlled model corresponding to the multiple nodes based on multiple pieces of the second rotation information.

21 Claims, 9 Drawing Sheets

(51) Int. Cl.
*G06T 7/246* (2017.01)
*G06T 13/40* (2011.01)
*G06T 7/00* (2017.01)
*G06V 40/10* (2022.01)
*G06V 40/16* (2022.01)

(52) U.S. Cl.
CPC ............... *G06T 7/74* (2017.01); *G06T 13/40* (2013.01); *G06V 40/10* (2022.01); *G06V 40/176* (2022.01); *G06T 2200/04* (2013.01); *G06T 2207/30196* (2013.01); *G06T 2207/30201* (2013.01)

(56) References Cited

U.S. PATENT DOCUMENTS

| | | | |
|---|---|---|---|
| 9,177,409 | B2 | 11/2015 | Rennuit et al. |
| 10,022,628 | B1 | 7/2018 | Matsumiya et al. |
| 10,319,133 | B1 | 6/2019 | Fleischer et al. |
| 2007/0126743 | A1 | 6/2007 | Park et al. |
| 2007/0146371 | A1 | 6/2007 | Dariush |
| 2010/0149341 | A1 | 6/2010 | Marks et al. |
| 2010/0197391 | A1 | 8/2010 | Geiss |
| 2010/0197399 | A1* | 8/2010 | Geiss ................. A63F 13/213 463/32 |
| 2010/0322111 | A1 | 12/2010 | Li |
| 2011/0249865 | A1 | 10/2011 | Lee et al. |
| 2012/0218262 | A1 | 8/2012 | Yomdin et al. |
| 2013/0195330 | A1 | 8/2013 | Kim et al. |
| 2013/0243255 | A1 | 9/2013 | Williams et al. |
| 2014/0219557 | A1 | 8/2014 | Liao |
| 2015/0003687 | A1* | 1/2015 | Utsunomiya ...... G06K 9/00342 382/107 |
| 2015/0036879 | A1* | 2/2015 | Shiozaki .................. G06T 7/75 382/103 |
| 2015/0161797 | A1 | 6/2015 | Park et al. |
| 2015/0199824 | A1 | 7/2015 | Kim et al. |
| 2016/0098095 | A1* | 4/2016 | Gonzalez-Banos ..... A63F 13/92 345/156 |
| 2016/0163084 | A1 | 6/2016 | Corazza |
| 2016/0267699 | A1 | 9/2016 | Borke et al. |
| 2017/0270709 | A1* | 9/2017 | Tran ........................ A43B 13/04 |
| 2018/0158196 | A1 | 6/2018 | Marks |
| 2018/0165860 | A1 | 6/2018 | Noh et al. |
| 2018/0335843 | A1 | 11/2018 | Erivantcev et al. |
| 2018/0345116 | A1 | 12/2018 | Wantanabe et al. |
| 2019/0156574 | A1 | 5/2019 | Fu et al. |
| 2019/0251341 | A1 | 8/2019 | Nie et al. |
| 2021/0026516 | A1 | 1/2021 | Holz |

FOREIGN PATENT DOCUMENTS

| | | |
|---|---|---|
| CN | 103971113 A | 8/2014 |
| CN | 104700433 A | 6/2015 |
| CN | 104866101 A | 8/2015 |
| CN | 106251396 A | 12/2016 |
| CN | 108027597 A | 5/2018 |
| CN | 108205654 A | 6/2018 |
| CN | 108227931 A | 6/2018 |
| CN | 108229239 A | 6/2018 |
| CN | 108229332 A | 6/2018 |
| CN | 108305321 A | 7/2018 |
| CN | 108357595 A | 8/2018 |
| CN | 108427942 A | 8/2018 |
| CN | 108472028 A | 8/2018 |
| CN | 108765274 A | 11/2018 |
| CN | 108874119 A | 11/2018 |
| CN | 109035415 A | 12/2018 |
| CN | 109146629 A | 1/2019 |
| CN | 109325450 A | 2/2019 |
| CN | 109816773 A | 5/2019 |
| CN | 110139115 A | 8/2019 |
| CN | 110688008 A | 1/2020 |
| CN | 110889382 A | 3/2020 |
| JP | 2002024807 A | 1/2002 |
| JP | 2003150977 A | 5/2003 |
| JP | 2007004732 A | 1/2007 |
| JP | 2007333690 A | 12/2007 |
| JP | 2012516504 A | 7/2012 |
| JP | 2012234541 A | 11/2012 |
| JP | 2015116308 A | 6/2015 |
| JP | 2015148706 A | 8/2015 |
| JP | 2017138915 A | 8/2017 |
| JP | 2017191576 A | 10/2017 |
| JP | 2018505462 A | 2/2018 |
| JP | 2018119833 A | 8/2018 |
| JP | 2018169720 A | 11/2018 |
| WO | 2018207388 A1 | 11/2018 |

OTHER PUBLICATIONS

State Intellectual Property Office of the People's Republic of China, Office Action and Search Report Issued in Application No. 201910365188 2, dated Sep. 26, 2021, 24 pages.
Intellectual property India, Office Action Issued in Application No. 202027050357, dated Sep. 10, 2021, 7 pages.
Intellectual property India, Office Action Issued in Application No. 202027050399, dated Sep. 6, 2021, 6 pages.
Intellectual property India, Office Action Issued in Application No. 202027050802, dated Sep. 27, 2021, 6 pages.
ISA State Intellectual Property Office of the People's Republic of China, Written Opinion of the International Searching Authority Issued in Application No. PCT/CN2020/072520, dated Apr. 23, 2020, 13 pages.
ISA State Intellectual Property Office of the People's Republic of China, Written Opinion of the International Searching Authority Issued in Application No. PCT/CN2020/072526, dated Apr. 21, 2020, 15 pages.
ISA State Intellectual Property Office of the People's Republic of China, Written Opinion of the International Searching Authority Issued in Application No. PCT/CN2020/072549, dated Apr. 21, 2020, 13 pages.
ISA State Intellectual Property Office of the People's Republic of China, Written Opinion of the International Searching Authority Issued in Application No. PCT/CN2020/072550, dated Apr. 21, 2020, 15 pages.
Non-Final Office Action Issued in U.S. Appl. No. 17/102,305, dated Oct. 4, 2021, 48 pages.
Non-Final Office Action Issued in U.S. Appl. No. 17/102,331, dated Oct. 6, 2021, 44 pages.
Non-Final Office Action Issued in U.S. Appl. No. 17/102,364, dated Oct. 4, 2021, 52 pages.
Lun R. et al., "The Design and Implementation of a Kinect-Based Framework for Selective Human Activity Tracking," 2016 IEEE International Conference on Systems, Man, and Cybernetics SMC 2016, Oct. 9-12, 2016, Budapest, Hungary, 6 pages.
Pavllo et al., "QuaterNet: A Quaternion-based Recurrent Model for Human Motion", British Machine Vision Conference (BMVC), 2018, arXiv:1805.06485v2 [cs.CV] Jul. 31, 2018, 14 pages.
Fragkiadaki et al., "Recurrent Network Models for Human Dynamics", Proceedings of the IEEE International Conference on Computer Vision, 2015, arXiv:1508.00271v2 [cs.CV] Sep. 29, 2015, 9 pages.
Chen et al., "Adversarial PoseNet: A Structure-aware Convolutional Network for Human Pose Estimation." IEEE Computer Society IEEE Computer Society, 2017, arXiv:1705.00389v2 [cs.CV] May 2, 2017, 14 pages.
Walker et al., "The Pose Knows: Video Forecasting by Generating Pose Futures." IEEE International Conference on Computer Vision IEEE, 2017, arXiv:1705.00053v1 [cs.CV] Apr. 28, 2017, 10 pages.
Office Action and Search Report Issued in Chinese Application No. 2019103651882, dated Apr. 6, 2021, 27 pages.
She Dairui et al, "Based on Operational Degree of Virtual Human Hand Motion Control of Obstacle Avoidance Algorithm" vol. 31 No. 12, Dec. 31, 2014, 6 pages [English abstract].
Chih-Wei Lin et al, "Indirect Adaptive Fuzzy Decoupling Control With a Lower Limb Exoskeleton" Proceedings of 2016 International

(56) References Cited

OTHER PUBLICATIONS

Conference on Advanced Robotics and Intelligent Systems, Taipei Nangang Exhibition Center, Taipei, Taiwan, Aug. 31-Sep. 2, 2016, 5 pages.
International Search Report for Application No. PCT/CN2020/072549, dated Apr. 21, 2020, 4 pages.
International Search Report for Application No. PCT/CN2020/072550, dated Apr. 21, 2020, 5 pages.
International Search Report for Application No. PCT/CN2020/072526, dated Apr. 21, 2020, 6 pages.
International Search Report for Application No. PCT/CN2020/072520, dated Apr. 23, 2020, 4 pages.
Zhang, Zuoyun, "The Design and Implementation of Kinect-Based Motion Capture System", ISSN:1674-0246, China Master's Theses Full-text Database, Information Science, Apr. 15, 2018, 97 pages (English Abstract).
Feng, Liang et al, "Research on Motion Control Technology of Virtual Human's Lower Limb Based on Optical Motion Capture Data", Journal of System Simulation, vol. 27, No. 2, Feb. 28, 2015, 10 pages (English Abstract).
Zuo, Guo-Yu et al, "Operator Attitude Algorithm for Telerobotic Nursing System", Acta Automatica Sinica, vol. 42, No. 12, ISSN:0254-4156, Dec. 31, 2016, 11 pages (English Abstract).
Intellectual property India, Office Action Issued in Application No. 202027050400, dated Dec. 13, 2021, 6 pages.
Japanese Patent Office Action, Office Action Issued in Application No. 2020-565269, dated Jan. 5, 2022, 10 pages.
Japanese Patent Office Action, Office Action Issued in Application No. 2020-567116, dated Jan. 20, 2022, 12 pages.
Japanese Patent Office, Decision of Rejection Issued in Application No. 2020-567116, dated May 17, 2022, 7 pages.
Japanese Patent Office, Office Action Issued in Application No. 2021-516694, mailed on May 18, 2022, 14 page.
Advisory Action Issued in U.S. Appl. No. 17/102,305, dated May 27, 2022, 3 pages.
Advisory Action Issued in U.S. Appl. No. 17/102,331, dated May 27, 2022, 3 pages.
Advisory Action Issued in U.S. Appl. No. 17/102,364, dated May 27, 2022, 5 pages.
Final Office Action Issued in U.S. Appl. No. 17/102,305, dated Mar. 15, 2022, 52 pages.
Final Office Action Issued in U.S. Appl. No. 17/102,331, dated Mar. 15, 2022, 42 pages.
Final Office Action Issued in U.S. Appl. No. 17/102,364, dated Mar. 17, 2022, 47 pages.
Ryuzo Okada et al., "Virtual fashion show using marker-less motion capture", Electronic Information and Communication Society Technology Research Report, Mar. 10, 2005, 6 pages [English Abstract].
Japanese Search Report by Registered Search Organization, Application No. 2021-516694, Industrial Property Cooperation Center, dated Apr. 1, 2022, 28 pages.
Office Action Issued in U.S. Appl. No. 17/102,305, dated Aug. 4, 2022, 43 pages.
Office Action Issued in U.S. Appl. No. 17/102,331, dated Jul. 5, 2022, 40 pages.
Office Action Issued in U.S. Appl. No. 17/102,364, dated Aug. 18, 2022, 41 pages.
Lien et al., "Subtly Different Facial Expression Recognition And Expression Intensity Estimation", Proceedings of the IEEE International Conference on Computer Vision and Pattern Recognition, Jun. 1998, Santa Barbara, CA, 7 pages.
Mahoor et al.; "A framework for automated measurement of the intensity of non-posed Facial Action Units", IEEE Conference on Computer Vision and Pattern Recognition, CVPR 2009, 7 pages.
Tian et al., "Facial Expression Analysis", Chapter 11 in "Handbook of Face Recognition", Springer, New York, NY, 2004, 31 pages.
Zhang et al., "Dynamic Facial Expression Analysis and Synthesis With MPEG-4 Facial Animation Parameters", IEEE Transactions on Circuits and Systems for Video Technology, vol. 18, No. 10, Oct. 2008, 15 pages.

* cited by examiner

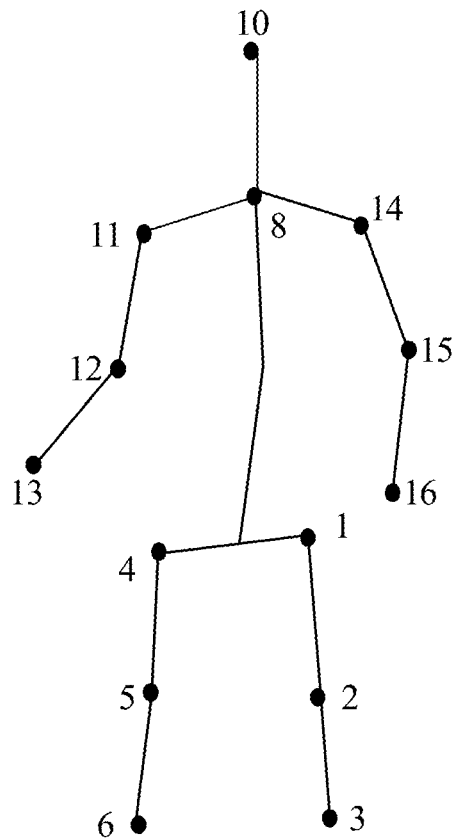
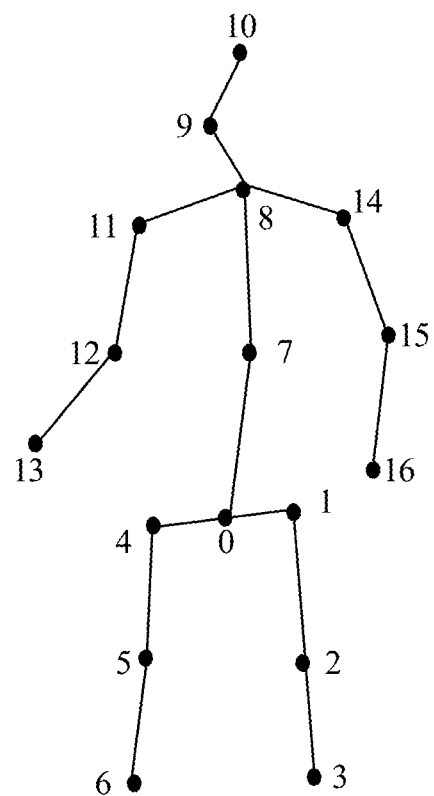
FIG. 7A                FIG. 7B
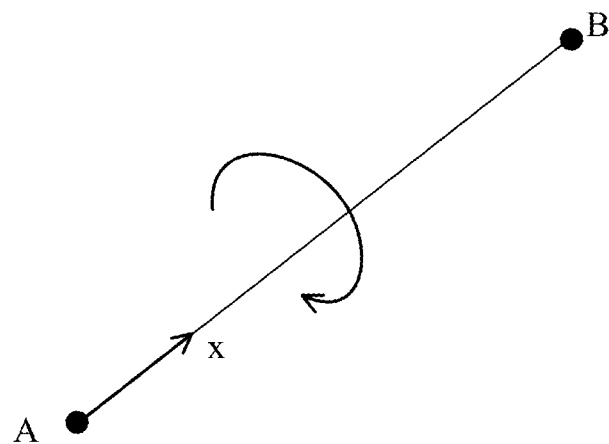
FIG. 8A

CONTROLLING DISPLAY OF A MODEL BASED ON CAPTURED IMAGES AND DETERMINED INFORMATION

CROSS REFERENCE TO RELATED APPLICATIONS

The present application is a continuation of International Application No. PCT/CN2020/072550, filed on Jan. 16, 2020, which claims priority to Chinese Patent Application No. 201910049830.6, filed on Jan. 18, 2019 and entitled "IMAGE PROCESSING METHOD AND APPARATUS, IMAGE DEVICE, AND STORAGE MEDIUM", and Chinese Patent Application No. 201910363858.7, filed on Apr. 30, 2019 and entitled "IMAGE PROCESSING METHOD AND APPARATUS, IMAGE DEVICE, AND STORAGE MEDIUM", all of which are incorporated herein by reference in their entirety.

TECHNICAL FIELD

The present disclosure relates to the field of information technologies, and in particular, to an image processing method and apparatus, an image device, and a storage medium.

BACKGROUND

With the development of information technologies, users may perform online teaching and webcasting through video recording, and somatosensory games or the like become possible. However, in some cases, for example, somatosensory games require users to wear special somatosensory devices to detect activities of their own limbs or the like in order to control game characters. Moreover, when conducting online teaching or webcasting, users' faces or limbs are completely exposed to the network. On the one hand, this may involve user privacy issues, and on the other hand, this may also involve information security issues. In order to solve the privacy or security issues, face images may be covered by mosaics or the like, which may affect the video effect.

SUMMARY

In this regard, embodiments of the present disclosure provide an image processing method and apparatus, an image device, and a storage medium.

In a first aspect, the present disclosure provides an image processing method, including:

obtaining an image; obtaining first rotation information of each of multiple nodes of a target based on the image; determining second rotation information of each child node with respect to its parent node in the multiple nodes of the target according to a hierarchical relationship among the nodes and the multiple pieces of first rotation information; and controlling movements of nodes in a controlled model corresponding to the multiple nodes based on the multiple pieces of second rotation information.

Based on the foregoing solution, obtaining the first rotation information of each of the multiple nodes of the target based on the image includes: obtaining the first rotation information of each of the multiple nodes of the target in a camera coordinate system based on the image.

Based on the foregoing solution, determining the second rotation information of each child node with respect to its parent node in the multiple nodes of the target according to the hierarchical relationship among the nodes and the multiple pieces of first rotation information includes: for each of the multiple nodes, taking the node as a child node; and determining the second rotation information in a local coordinate system where the child node is located with respect to a local coordinate system where a parent node of the child node is located according to the hierarchical relationship and the multiple pieces of first rotation information.

Based on the foregoing solution, the method further includes: determining, for each of the multiple nodes, a local coordinate system where the node is located according to the hierarchical relationship.

Based on the foregoing solution, determining the local coordinate system where the node is located according to the hierarchical relationship includes: taking the node as a child node; taking a direction in which the child node points to a parent node of the child node as a first direction of the local coordinate system according to the hierarchical relationship; taking a perpendicular direction of a plane where the child node and two nodes connected to the child node are located as a second direction of the local coordinate system; and taking an orientation of a predetermined part of the target as a third direction of the local coordinate system.

Based on the foregoing solution, obtaining the first rotation information of each of the multiple nodes of the target in the camera coordinate system based on the image includes: obtaining a first quaternion of each of the multiple nodes of the target in the camera coordinate system based on the image.

Based on the foregoing solution, determining the second rotation information of each child node with respect to its parent node in the multiple nodes of the target according to the hierarchical relationship among the nodes and the multiple pieces of first rotation information includes: taking each of the multiple nodes as a child node and determining a parent node of the child node according to the hierarchical relationship; and for each child node, determining a second quaternion of the child node with respect to the parent node based on the first quaternion of the parent node of the child node in the camera coordinate system and the first quaternion of the child node in the camera coordinate system.

Based on the foregoing solution, controlling the movements of the nodes in the controlled model corresponding to the multiple nodes based on the multiple pieces of second rotation information includes: determining, for each piece of second rotation information, whether the second rotation information satisfies a constraint condition; and if the second rotation information satisfies the constraint condition, controlling a movement of a node in the controlled model corresponding to a child node associated with the second rotation information according to the second rotation information.

Based on the foregoing solution, determining, for each piece of second rotation information, whether the second rotation information satisfies the constraint condition includes: converting the second rotation information into a first angle in a coordinate system with a predetermined type; determining whether the first angle is within a preset angle range; and if the first angle is within the preset angle range, determining that the second rotation information satisfies the constraint condition.

Based on the foregoing solution, the method further includes: determining that the second rotation information does not satisfy the constraint condition if the first angle is outside the preset angle range.

Based on the foregoing solution, the method further includes: correcting the second rotation information to obtain third rotation information if the second rotation information does not satisfy the constraint condition; and controlling a movement of a node in the controlled model corresponding to a child node associated with the second rotation information according to the third rotation information.

Based on the foregoing solution, correcting the second rotation information to obtain third rotation information if the second rotation information does not satisfy the constraint condition includes: if the first angle corresponding to the second rotation information is outside the preset angle range, correcting the first angle according to a preset angle to obtain a second angle; and obtaining the third rotation information according to the second angle.

Based on the foregoing solution, the coordinate system with the predetermined type is an Eulerian coordinate system.

Based on the foregoing solution, controlling the movements of the nodes in the controlled model corresponding to the multiple nodes based on the multiple pieces of second rotation information includes: performing posture defect correction on the multiple pieces of second rotation information or the multiple pieces of third rotation information generated from the multiple pieces of second rotation information to respectively obtain multiple corrected fourth rotation information; and controlling the movements of the nodes in the controlled model corresponding to the multiple nodes by using the multiple pieces of fourth rotation information.

Based on the foregoing solution, the posture defect correction includes at least one of the following: an ipsilateral defect of upper and lower limbs; a bowleg movement defect; a splayfoot movement defect; or a pigeon-toe movement defect.

Based on the foregoing solution, the method further includes: obtaining a posture defect correction parameter according to difference information between a body form of the target and a standard body form, where the posture defect correction parameter is used for correcting the second rotation information or the third rotation information.

Based on the foregoing solution, the method further includes: obtaining a posture defect correction parameter according to difference information between a body form of the target and a standard body form, where the posture defect correction parameter is used for correcting the multiple pieces of second rotation information or the multiple pieces of third rotation information.

In a second aspect, the present disclosure provides an image processing apparatus, including:

a first obtaining module, configured to obtain an image; a second obtaining module, configured to obtain first rotation information of each of multiple nodes of a target based on the image; a first determining module, configured to determine second rotation information of each child node with respect to its parent node in the multiple nodes of the target according to a hierarchical relationship among the nodes and the multiple pieces of first rotation information; and a controlling module, configured to control movements of nodes in a controlled model corresponding to the multiple nodes based on the multiple pieces of second rotation information.

In a third aspect, the present disclosure provides an image device, including:

a memory, and a processor, connected to the memory and configured to execute computer executable instructions on the memory so as to implement the image processing method according any one of the foregoing.

In a fourth aspect, the present disclosure provides a non-volatile computer storage medium, having computer executable instructions stored thereon, where after the computer executable instructions are executed by a processor, the image processing method according to any one of the foregoing can be implemented.

In the technical solution provided by the embodiments of the present disclosure, first rotation information and second rotation information of each of multiple nodes of a target are obtained by an obtained image, and then nodes in a controlled model corresponding to the multiple nodes are controlled by means of the multiple pieces of second rotation information. In this way, an image including a target is no longer directly output, but a controlled model is used to simulate the target for movement, and thus, direct exposure of the target to the network during online teaching, game control and live streaming, etc. is avoided, thereby maintaining the user's privacy. Further, in controlling the movement of the controlled model, the conversion from the first rotation information to the second rotation information is implemented based on the hierarchical relationship between parent nodes and child nodes, so that the controlled model can accurately simulate the target, thereby providing a good control effect.

BRIEF DESCRIPTION OF THE DRAWINGS

FIG. 7A is a schematic diagram of nodes included in a human skeleton provided by embodiments of the present disclosure.

FIG. 7B is a schematic diagram of nodes included in another human skeleton provided by embodiments of the present disclosure.

FIG. 8A is a schematic diagram of determining a first direction provided by embodiments of the present disclosure.

DETAILED DESCRIPTIONS

The technical solutions of the present disclosure are further described in detail below with reference to the accompanying drawings and specific embodiments of the description.

Figure 1:
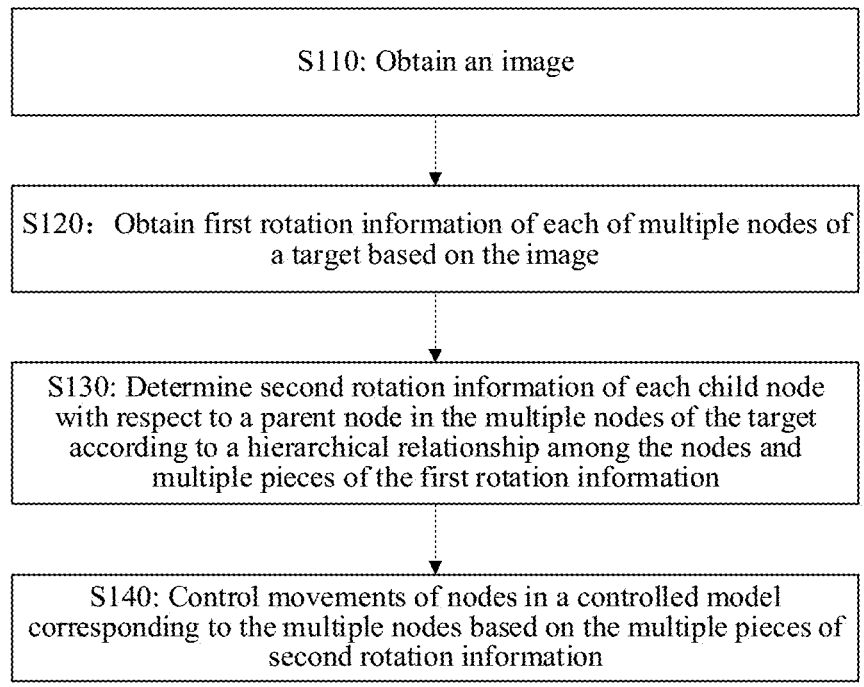
FIG. 1 is a schematic flowchart of a first image processing method provided by embodiments of the present disclosure.

As shown in FIG. 1, the embodiments provide an image processing method, including the following steps.

At step S110, an image is obtained.

At step S120, first rotation information of each of multiple nodes of a target is obtained based on the image.

At step S130, second rotation information of each child node with respect to its parent node in the multiple nodes of the target is determined according to a hierarchical relationship among the nodes and the multiple pieces of first rotation information.

At step S140, movements of nodes in a controlled model corresponding to the multiple nodes are controlled based on the multiple pieces of second rotation information.

According to the image processing method provided in the embodiments, the movement of a controlled model may be driven through image processing. The image processing method provided in the embodiments may be applied to an image device, and the image device may be various electronic devices capable of performing image processing, for example, electronic devices that perform image acquisition, image display, and image pixel reorganization to generate an image. The image device includes, but is not limited to, various terminal devices, for example, mobile terminals and/or fixed terminals, and may also include various image servers capable of providing image services. The mobile terminal includes portable devices such as mobile phones or tablet computers that users can easily carry, and may also include devices worn by users, such as smart wristbands, smart watches, and smart glasses. The fixed terminal includes fixed desktop computers or the like.

In the embodiments, the image obtained in step S110 may be a two-dimensional (abbreviated as 2D) image or a three-dimensional (abbreviated as 3D) image.

The 2D image may include an image acquired by a monocular or multiocular camera, such as a Red-Green-Blue (RGB) image. The approach of obtaining the image may include: acquiring the image using a camera of the image device itself; and/or, receiving the image from an external device; and/or, reading the image from a local database or local memory.

The 3D image may be a 3D image obtained by detecting 2D coordinates from a 2D image and then using a conversion algorithm from the 2D coordinates to 3D coordinates, or the 3D image may be an image acquired by a 3D camera.

Step S120 may include: performing detection on the image to obtain first rotation information of predetermined nodes included in the target. If the target is a person, the predetermined nodes may be human body nodes, or may not be limited to human body nodes.

For example, taking the target being a person as an example, the nodes of the target may include at least two of the following: a head node, a neck node, a shoulder node, an elbow node, a wrist node, a waist node, a thigh node, a knee node, an ankle node, and/or an instep node, etc.

In some other embodiments, the target is not limited to a person, but may also include various living organisms that can move, such as animals, or non-living objects.

The first rotation information of the multiple nodes of the target can be combined to reflect local and/or overall rotation information of the target.

The first rotation information includes, but is not limited to, the rotation angle of the node with respect to a reference point in the target, the rotation angle of the node with respect to a reference position, the position information of the node with respect to the reference point in the target, and/or the position information of the node with respect to the reference position, etc.

In the embodiments, detection may be performed on the image by a deep learning model such as a neural network to obtain first rotation information and/or second rotation information.

The controlled model may be a model corresponding to the target. For example, if the target is a person, the controlled model is a human body model; if the target is an animal, the controlled model may be a body model of the corresponding animal; and if the target is a vehicle, the controlled model may be a model of the vehicle.

In the embodiments, the controlled model is a model for the category of the target. The model may be predetermined and may be further in multiple styles. The style of the controlled model may be determined based on a user instruction, and the style of the controlled model may be various, for example, a live-action style in which a real person is simulated, an anime style, an Internet celebrity style, a style with a different temperament, and a game style. The style with a different temperament may be a literary style or a rock style. In the game style, the controlled model may be a character in a game.

For example, in the process of online teaching, some teachers are reluctant to expose their faces and bodies, considering that these are privacy. Directly recording a video necessarily causes a teacher's face and body to be exposed. In the embodiments, an image of a teacher's movement may be obtained through image acquisition or the like, and then movement of a virtual controlled model may be controlled through feature extraction and obtaining of first rotation information. In this way, on the one hand, through the teacher's own limb movement, the controlled model can simulate the teacher's movement to complete limb movement for teaching; on the other hand, teaching is performed using the movement of the controlled model, and the teacher's face and body do not need to be directly exposed in the teaching video, thereby protecting the teacher's privacy.

For another example, with regard to a road monitoring video, if a video of a vehicle is directly acquired, once the video is exposed to the network, all information of some specific users' vehicles may be exposed, but if monitoring is not performed, it may not be possible to determine the responsibility when a traffic accident occurs. If the method in the embodiments is used, real vehicle movement is simulated by a vehicle model to obtain a monitoring video, the license plate information of the vehicle and/or the overall outer contour of the vehicle are retained in the monitoring video, and the brand, model, color, and ageing condition of the vehicle may be hidden, thereby protecting user privacy.

In some embodiments, step S130 includes: determining the second rotation information in a local coordinate system where each child node is located with respect to a local coordinate system where its parent node is located according to the hierarchical relationship and the multiple pieces of first rotation information.

In the embodiments, the multiple nodes of the target are hierarchical, and the hierarchical relationship is determined by the driving relationship among the nodes. For example, assuming that the target is a person and the nodes are joints in the human body, there is a certain driving relationship among the nodes, and the driving relationship may be determined based on the hierarchical relationship. For example, certain movements of the elbow joint may drive movements of the wrist joint. The hierarchical relationship is reflected in that: some nodes are parent or child nodes of other nodes.

Therefore, in the embodiments, according to the hierarchical relationship and the multiple pieces of first rotation information, information of more or less rotation of each child node than its parent node is obtained, and then the second rotation information is obtained. For example, in addition to rotating with the elbow joint, the wrist joint itself has other rotations, and information of the more rotation of the wrist than the elbow joint is the second rotation information.

As such, in step S130, net rotation information (i.e., second rotation information) of each child node with respect to its parent node in the multiple nodes of the target may be obtained based on the hierarchical relationship and the multiple pieces of first rotation information, where the second rotation information is used to control the movement of a node in the controlled model corresponding to the child node. In this way, the movements of corresponding nodes in the controlled model follow the hierarchical relationship among the nodes of the target in the image, so that the controlled model can accurately simulate the movement of the target in the image.

It should be noted that, for a root node, that is, a node without a parent node, its second rotation information may be consistent with its first rotation information. For example, for a human body, the root node may be the pelvis.

Specifically, the method further includes: determining a local coordinate system where each node is located according to the hierarchical relationship.

In the embodiments, different nodes have their own local coordinate systems. The local coordinate system is determined based on the hierarchical relationship, and the local coordinate system includes but is not limited to: a coordinate system established for a child node with respect to its parent node, a coordinate system established for a parent node with respect to its child node, and a coordinate system established for a node with respect to a reference node in the target. For example, taking the target being a person as an example, the reference node may be a waist node or a hip node or the like of the human body.

In one example, for one child node, determining the local coordinate system where the child node is located according to the hierarchical relationship includes: taking a direction in which the child node points to its parent node as a first direction of the local coordinate system according to the hierarchical relationship; taking a perpendicular direction of a plane where the child node and two nodes connected to the child node are located as a second direction of the local coordinate system; and taking an orientation of a predetermined part of the target as a third direction of the local coordinate system.

In this example, the local coordinate systems of nodes are all 3D coordinate systems. The directions of the three axes need to be determined for the 3D coordinate system. The three axes are calculated in a global coordinate system. The directions of the three axes may be regarded as vectors in a global space, and the three directions are orthogonal to each other. By determining the local coordinate system, it is more convenient to calculate rotation information of each node.

In this example, a direction in which the child node points to its parent node is taken as a first direction of the local coordinate system according to the hierarchical relationship. For example, a direction in which the wrist joint points to the elbow joint is the first direction of the 3D coordinate system. Such a local coordinate system is established, and because the relative position relationship between the parent node and the child node is also considered, the coordinates of the child node in the 3D coordinate system may represent the second rotation information of the child node with respect to the parent node.

The two nodes connected to the child node include the parent node. For example, if the child node is a wrist node, the parent node of the wrist node may include an elbow node; a hand node is a child node of the wrist node; the three points, i.e., the wrist node, the elbow node, and the hand node, form a plane, and the perpendicular direction of the plane is the second direction.

The specific method for obtaining the second direction may be as follows: the child node and a first node in the two nodes connected to the child node form a vector I; the child node and a second node in the two nodes connected to the child node form a vector II; and the vector I and the vector II are cross-multiplied to obtain a normal vector of the two vectors, where the direction of the normal vector is the second direction.

Referring to FIG. 8A, if node A is a child node of node B, the first direction is direction x in which node A points to node B as shown in FIG. 8A.

Figure 8B:
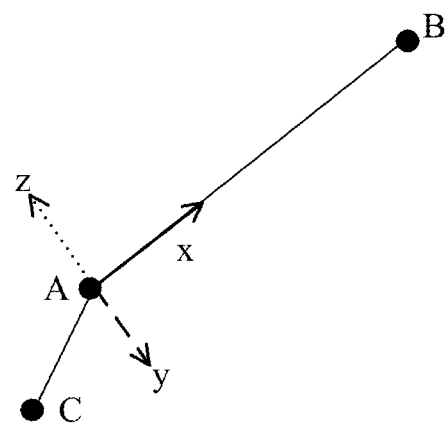
FIG. 8B is a schematic diagram of determining a second direction provided by embodiments of the present disclosure.

Referring to FIG. 8B, the second direction may be: a perpendicular direction of a plane where two bones connected to node A are located. The specific determining approach may include: connecting node A and node C to form a vector; connecting node A and node B to form another vector; and cross-multiplying the two vectors to obtain a normal vector of the two vectors, where the direction of the normal vector is the second direction y. The direction z in FIG. 8B may be the orientation of the human torso, that is, the third direction. In some embodiments, the third direction may also be the orientation of the human face.

Figure 8C:
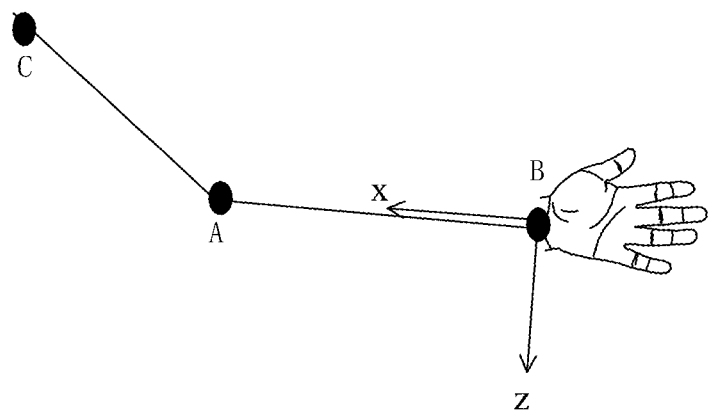
FIG. 8C is a schematic diagram of a local coordinate system where a wrist node is located provided by embodiments of the present disclosure.

In another example, the method for determining the local coordinate system may be as shown in FIG. 8C. Node B is a wrist node, and z is a normal vector obtained by cross-multiplying vector I from the wrist to the forearm and vector II from the wrist to the hand.

Figure 9:
FIG. 9 is a schematic diagram of a three-dimensional coordinate system of nodes included in a human body provided by embodiments of the present disclosure.

FIG. 9 is a schematic diagram of effects of establishing 3D coordinate systems of different nodes (joints) in a human body.

Moreover, a child node may have different rotation directions, and a direction with the maximum rotation angle among the different rotation directions is regarded as the second direction of the foregoing 3D coordinate system. For example, the shoulder, wrist, ankle, waist, or neck can be rotated in multiple directions, but the maximum rotation angles in different directions are different. In the embodiments, the direction with the maximum angle selectable for the child node is directly used as the second direction of the local coordinate system.

In the embodiments, the other direction of the 3D coordinate system is related to the orientation of the target. In the embodiments, the target may include multiple parts, and in the embodiments, the orientation of the entire target may be replaced with that of one or more parts of the target. For example, if the target is a person, the orientation of the target may be the orientation of the human face, or may be the orientation of the human torso. In the embodiments, the orientation of the human torso is selected as the orientation of the target.

In some embodiments, step S120 includes: obtaining a first quaternion of each of the multiple nodes of the target in a camera coordinate system based on the image.

In the embodiments, the first rotation information may be determined based on the camera coordinate system. In one example, the first rotation information is represented by a quaternion which is a data format convenient for representing rotation information. In another example, the first rotation information may also be represented by coordinate values in various coordinate systems, for example, coordinate values in an Eulerian coordinate system and/or coordinate values in a Lagrangian coordinate system. In the embodiments, in order to distinguish different quaternions, the quaternion of a node of the target directly extracted from the camera coordinate system corresponding to the image is called a first quaternion. The "first" here does not have a specific meaning, but is used for distinguishing.

Further, step S130 may include: for each of the multiple nodes of the target, determining a parent node of the node when the node is taken as a child node according to the hierarchical relationship; and determining a second quaternion of the child node with respect to the parent node based on the first quaternion of the parent node in the camera coordinate system and the first quaternion of the child node in the camera coordinate system.

Figure 2:
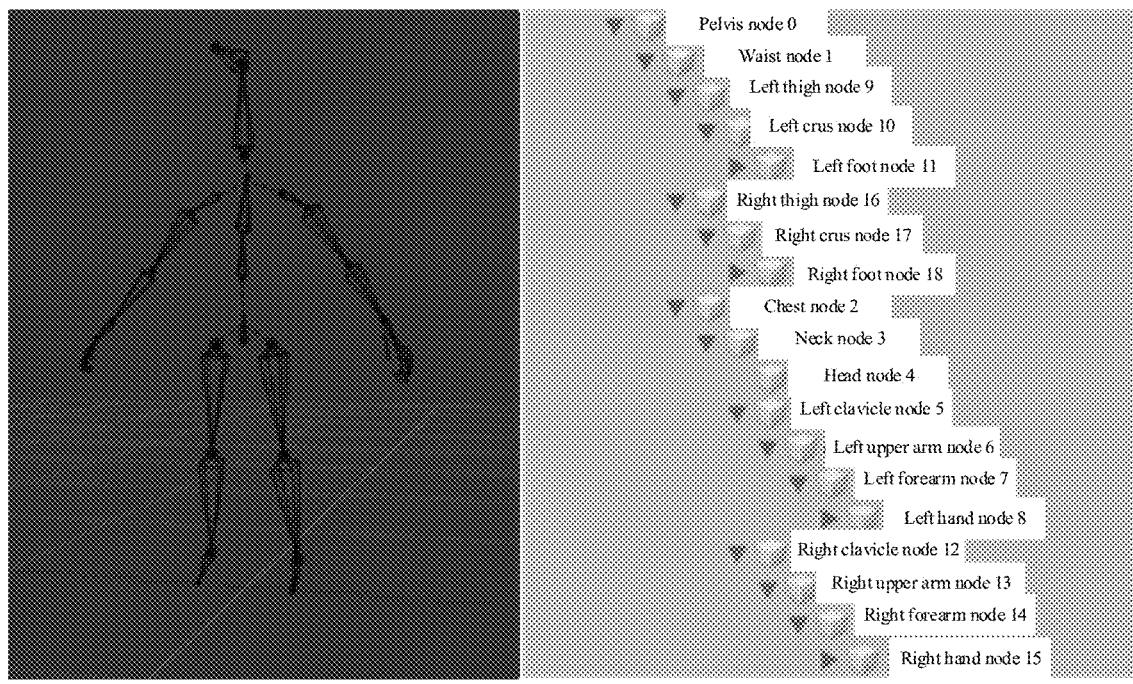
FIG. 2 is a schematic diagram of a first hierarchical relationship between nodes provided by embodiments of the present disclosure.

The hierarchical relationships between nodes of different targets may be predetermined, for example, if the target is a person, an electronic device may know the hierarchical relationship between nodes of the human body in advance. As shown in FIG. 2, the hierarchical relationship between nodes of the human body may be as follows. For example, waist node 1 is a child node of pelvis node 0; left thigh node 9 is a child node of waist node 1; left crus node 10 is a child node of left thigh node 9; and left foot node 11 is a child node of left crus node 10. Right thigh node 16 is a child node of waist node 1; right crus node 17 is a child node of right thigh node 16; and right foot node 18 is a child node of right crus node 17. Chest node 2 is a child node of waist node 1; neck node 3 is a child node of chest node 2; and head node 4 is a child node of neck node 3. Left upper arm node 6 is a child node of left clavicle node 5; left forearm node 7 is a child node of left upper arm node 6; and left hand node 8 is a child node of left forearm node 7. Right upper arm node 13 is a child node of right clavicle node 12; right forearm node 14 is a child node of right upper arm node 13; and right hand node 15 is a child node of right forearm node 14.

After obtaining the hierarchical relationship, based on the first quaternion of each node in the camera coordinate system, second rotation information of a child node with respect to its parent node may be obtained by conversion. For example, the difference between the first quaternion of the child node and the first quaternion of the parent node may be the second rotation information.

In some embodiments, the method further includes: determining, for each piece of second rotation information, whether the second rotation information satisfies a constraint condition; and step S140 may include: if the second rotation information satisfies the constraint condition, controlling a movement of a node in the controlled model corresponding to a child node associated with the second rotation information according to the second rotation information.

In one example, a node has a maximum rotation angle in the target, and this rotation angle may be one of the above constraint condition.

For example, taking the neck of a human body as an example, the neck may only be rotated to the left and/or right by 90 degrees with respect to the human torso, but not 180 or 270 degrees, and the maximum angle of rotation to the left or right is the boundary angle of the constraint condition.

Determining, for each piece of second rotation information, whether the second rotation information satisfies the constraint condition includes: determining whether a rotation direction of the corresponding child node indicated by the second rotation information is a direction in which the child node can be rotated; determining whether a rotation angle indicated by the second rotation information does not exceed a maximum angle of the child node in the corresponding rotation direction; and if the rotation direction of the child node indicated by the second rotation information is a direction in which the child node can be rotated, and if the rotation angle of the child node indicated by the second rotation information does not exceed the maximum angle of the child node in the corresponding rotation direction, determining that the second rotation information satisfies the constraint condition.

In step S140, rotation of a corresponding node in the controlled model may be directly controlled by using the second rotation information that satisfies the constraint condition.

In still some other embodiments, the method further includes: if the rotation direction of the corresponding child node indicated by the second rotation information is a direction in which the child node cannot be rotated, rotation information in the rotation direction is removed from the second rotation information; and/or if the rotation angle of the child node indicated by the second rotation information exceeds the maximum angle of the child node in the corresponding rotation direction, the rotation angle in the rotation direction in the second rotation information is replaced with the maximum angle. In this way, corrected second rotation information is obtained. The corrected second rotation information satisfies the constraint condition.

In step S140, rotation of the corresponding node in the controlled model may be controlled according to the corrected second rotation information that satisfies the constraint condition.

In one example, determining, for the second rotation information, whether the second rotation information satisfies the constraint condition includes: converting the second rotation information into a first angle in a coordinate system with a predetermined type; determining whether the first angle is within a preset angle range; and if the first angle is within the preset angle range, determining that the second rotation information satisfies the constraint condition.

Determining of whether the angle is within the preset angle range here is a way to determine whether the second rotation information satisfies the constraint condition, and the specific implementation may be determining whether coordinate values in a predetermined coordinate system are within a predetermined range.

In short, there are many ways to determine whether the second rotation information satisfies the constraint condition, which is not limited to any one of the above.

Further, the method further includes: determining that the second rotation information does not satisfy the constraint condition if the first angle is outside the preset angle range.

Still further, the second rotation information is corrected to obtain third rotation information if the second rotation information does not satisfy the constraint condition. The third rotation information here is the foregoing corrected second rotation information that satisfies the constraint condition.

Thus, step S140 may include: controlling the movements of the nodes in the controlled model corresponding to the multiple nodes according to the multiple pieces of third rotation information.

Correcting the second rotation information to obtain the third rotation information if the second rotation information does not satisfy the constraint condition includes: if the first angle corresponding to the second rotation information is outside the preset angle range, correcting the first angle according to a preset angle to obtain a second angle; and obtaining the third rotation information according to the second angle.

In the embodiments, the second angle may include, but is not limited to, the maximum angle by which the node can be rotated in the corresponding rotation direction.

For example, two included angles are formed between the orientation of the face and the orientation of the torso, and the sum of the two included angles is 180 degrees. It is assumed that the two included angles are angle 1 and angle 2, respectively. The constraint condition for the neck connecting the face and the torso is: −90 to 90 degrees, and angles exceeding 90 degrees are excluded from the constraint condition. In this way, it is possible to reduce abnormalities that the rotation angle exceeds 90 degrees clockwise or counterclockwise, for example, 120 degrees and 180 degrees, in the process that the controlled model simulates the movement of the target. The constraint condition corresponds to two extreme angles, one is −90 degrees and the other is 90 degrees. If a rotation angle exceeds the range of −90 to 90 degrees, the detected rotation angle is modified to the maximum angle defined by the constraint condition. For example, if a rotation angle exceeding 90 degrees (for example, the 120 degrees or 180 degrees above) is detected, the detected rotation angle is modified to an extreme angle closer to the detected rotation angle, for example, 90 degrees.

In some embodiments, step S140 includes: performing posture defect correction on the multiple pieces of second rotation information or the multiple pieces of third rotation information generated from the multiple pieces of second rotation information to respectively obtain multiple corrected fourth rotation information; and controlling the movements of the nodes in the controlled model corresponding to the multiple nodes by using the multiple pieces of fourth rotation information.

In some embodiments, the target itself has a certain defect in movement, and such a defect is called posture defect. In order to make the movement of the controlled model more coordinated, posture defect correction may be performed on the second rotation information and/or the third rotation information to obtain corrected fourth rotation information, and the corrected fourth rotation information with the posture defect overcome is used when controlling the controlled model.

In some embodiments, the posture defect correction includes at least one of the following: an ipsilateral defect of upper and lower limbs; a bowleg movement defect; a splayfoot movement defect; or a pigeon-toe movement defect.

In some embodiments, the method further includes: obtaining a posture defect correction parameter according to difference information between a body form of the target and a standard body form, where the posture defect correction parameter is used for correcting the second rotation information or the third rotation information.

For example, before controlling the controlled model using the image including the target, the body form of the target is detected first, and then the detected body form is compared with a standard body form to obtain difference information; and posture defect correction is performed through the difference information.

A prompt about maintaining a predetermined posture may be output on a display interface, and a user maintains the predetermined posture after seeing the prompt, so that the image device may acquire an image of the user maintaining the predetermined posture. Then, whether the predetermined posture maintained by the user is standard enough is determined through image detection to obtain the difference information.

For example, some persons have splayfeet, while a normal standard standing posture should be that connecting lines between the tiptoes and the heels of the feet are parallel. After obtaining the second rotation information or the third rotation information corresponding to features of the target, correction of such non-standardness in the body form (i.e., the posture defect correction) may be considered when controlling the controlled model.

In some other embodiments, the method further includes: correcting proportions of different parts of a standard model according to a proportional relationship among different parts of the target to obtain a corrected controlled model.

There may be differences in the proportional relationships between parts of different targets. For example, taking a person as an example, the proportion of the leg length to the head length of a professional model is greater than that of an ordinary person. For another example, some persons have full buttocks, and the distances between their hips may be greater than that of an ordinary person.

The standard model may be a mean value model obtained based on a large amount of human body data. In order to make the controlled model more accurately simulate the movement of the target, in the embodiments, the proportions of different parts of the standard model are corrected according to the proportional relationship among different parts of the target to obtain a corrected controlled model. For example, taking the target being a person as an example, the corrected parts include but are not limited to the hips and/or the legs.

Figure 3A:
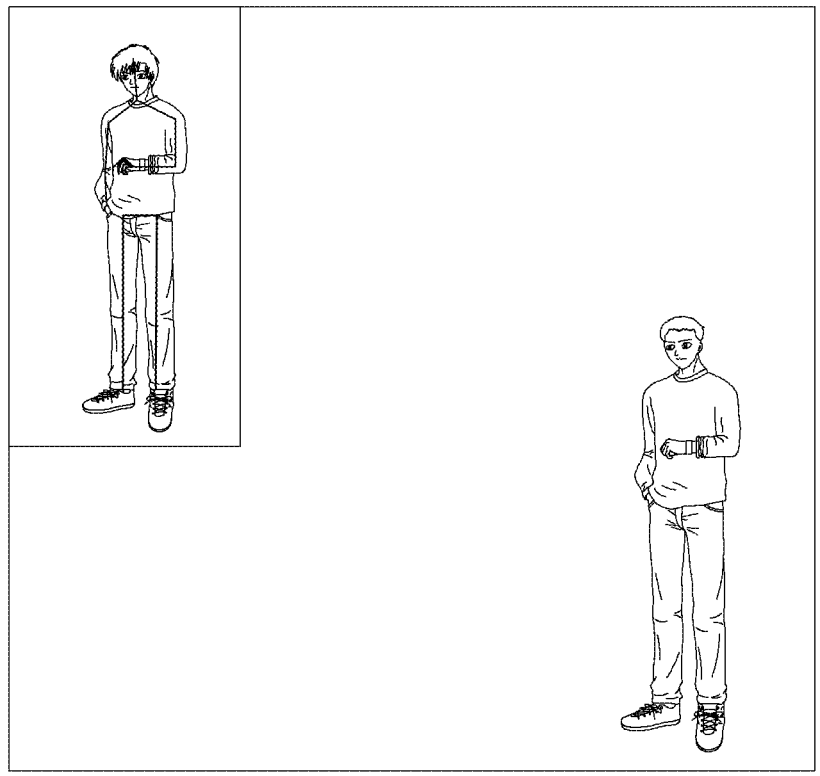
FIG. 3A to FIG. 3C are schematic diagrams of a controlled model simulating acquired changes in hand movement of a user provided by embodiments of the present disclosure.
Figure 3B:
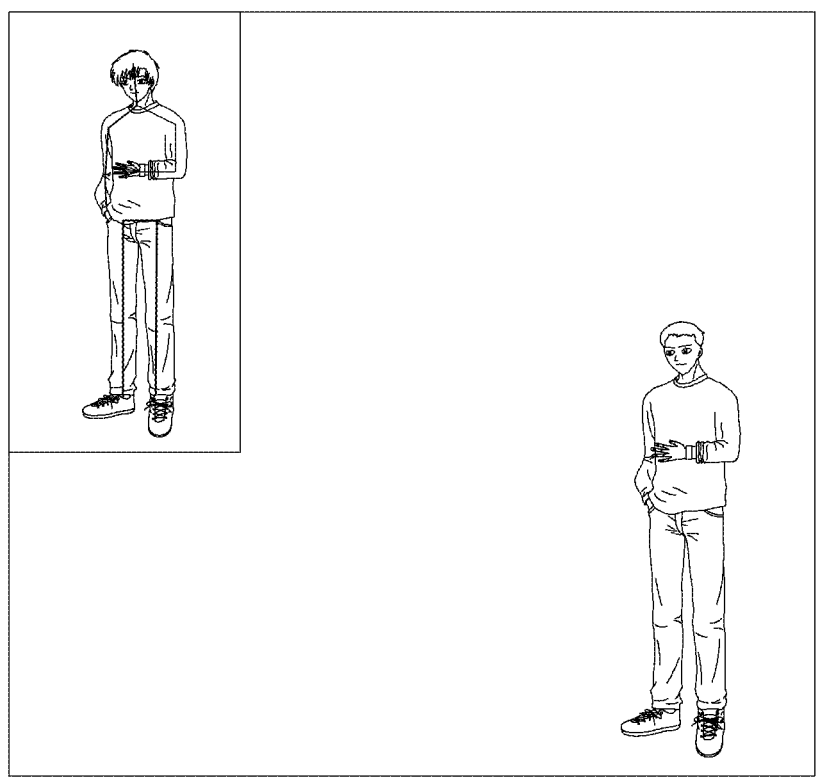
Figure 3C:
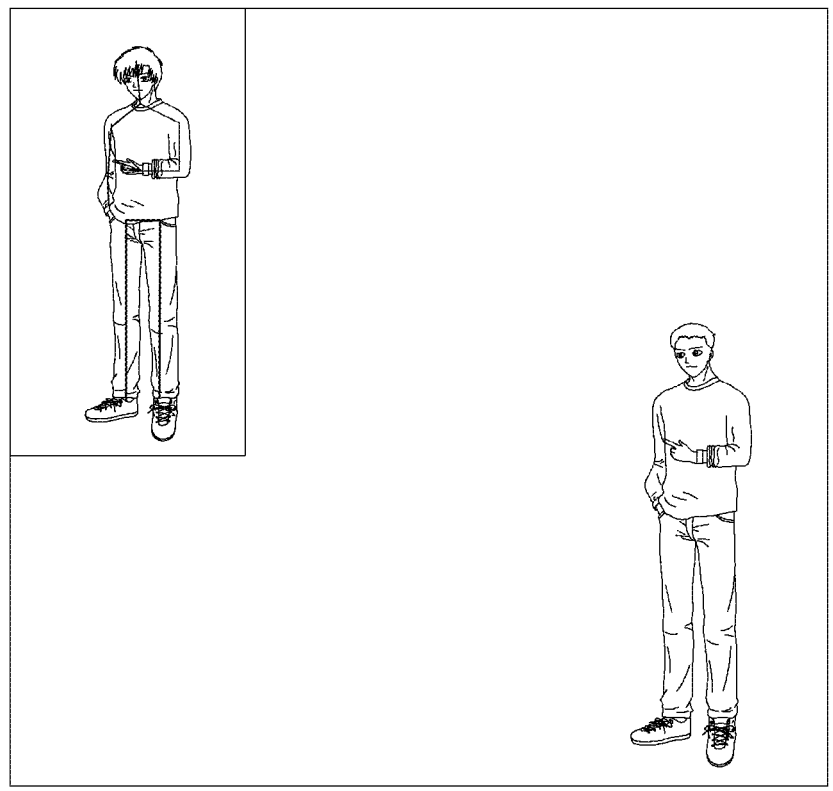

As shown in FIGS. 3A, 3B, and 3C, the small image in the upper left corner of the image is an acquired image, and in the lower right corner is the controlled model of the human body. The user's hand moves. From FIG. 3A to FIG. 3B and then from FIG. 3B to FIG. 3C, the user's hand moves, and the hand of the controlled model also follows the movements. The user's hand movements sequentially change from first clenching to palm extension and then to index finger extension in FIGS. 3A to 3C, and the controlled model simulates the user's gestures to change from first clenching to palm extension and then to index finger extension.

Figure 4A:
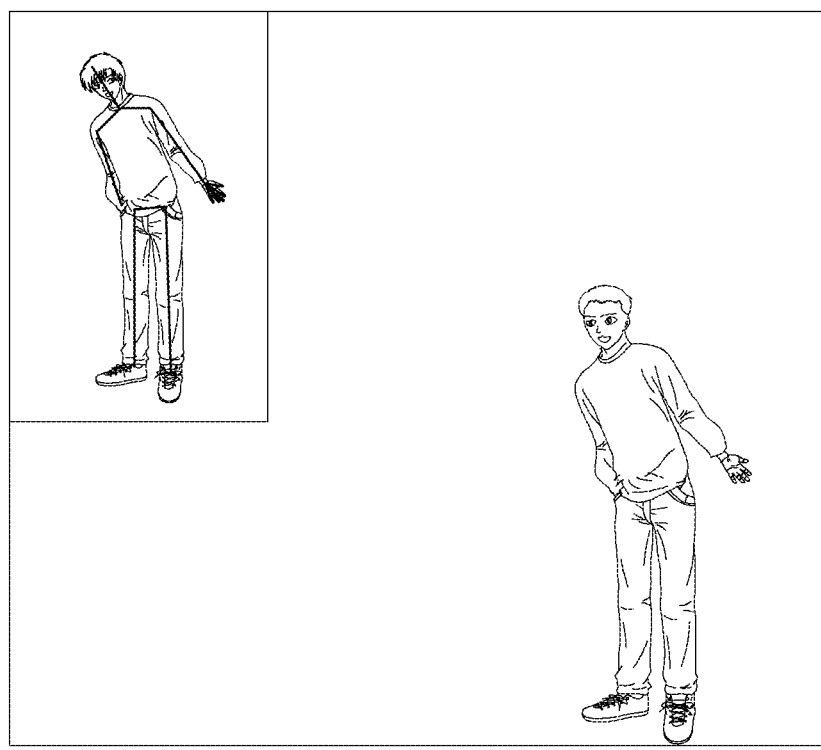
FIG. 4A to FIG. 4C are schematic diagrams of a controlled model simulating acquired changes in torso movement of a user provided by embodiments of the present disclosure.
Figure 4B:
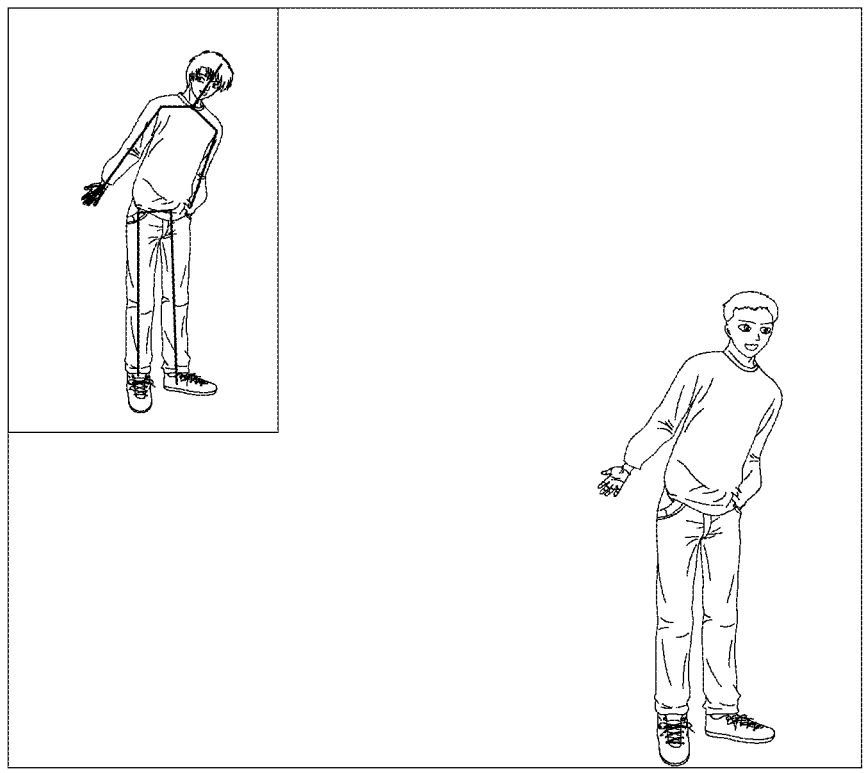
Figure 4C:
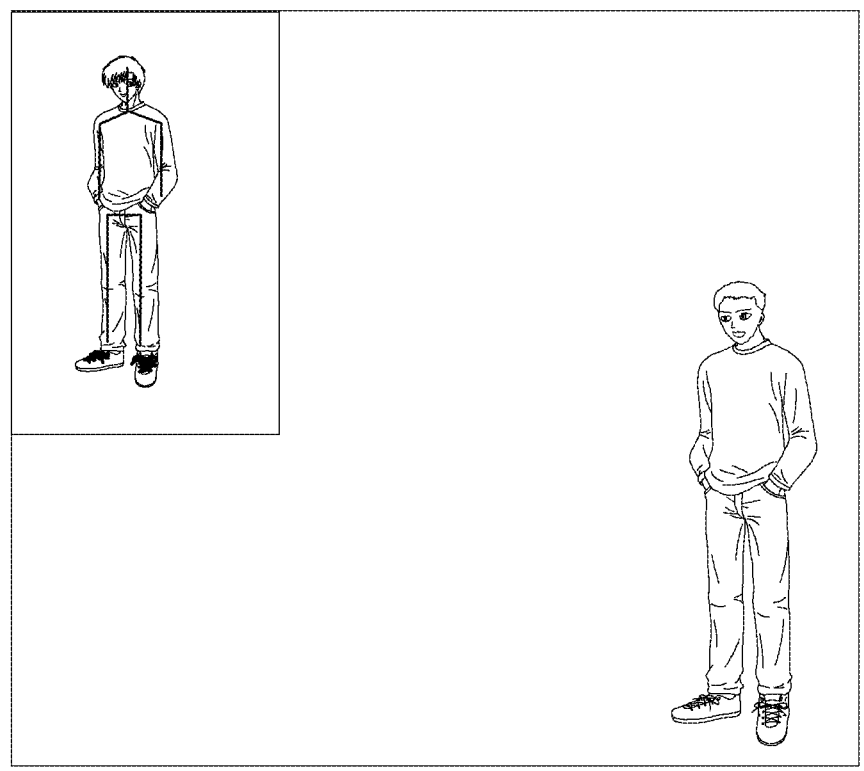

As shown in FIGS. 4A, 4B, and 4C, the small image in the upper left corner of the image is an acquired image, and in the lower right corner is the controlled model of the human body. The user's torso moves. From FIG. 4A to FIG. 4B and then from FIG. 4B to FIG. 4C, the user's torso moves, and the torso of the controlled model also follows the movements. From FIGS. 4A to 4C, the user changes from tilting the hips toward the right of the image to tilting the hips toward the left of the image and then to standing upright finally, and the controlled model also simulates the user's torso movements.

Figure 5A:
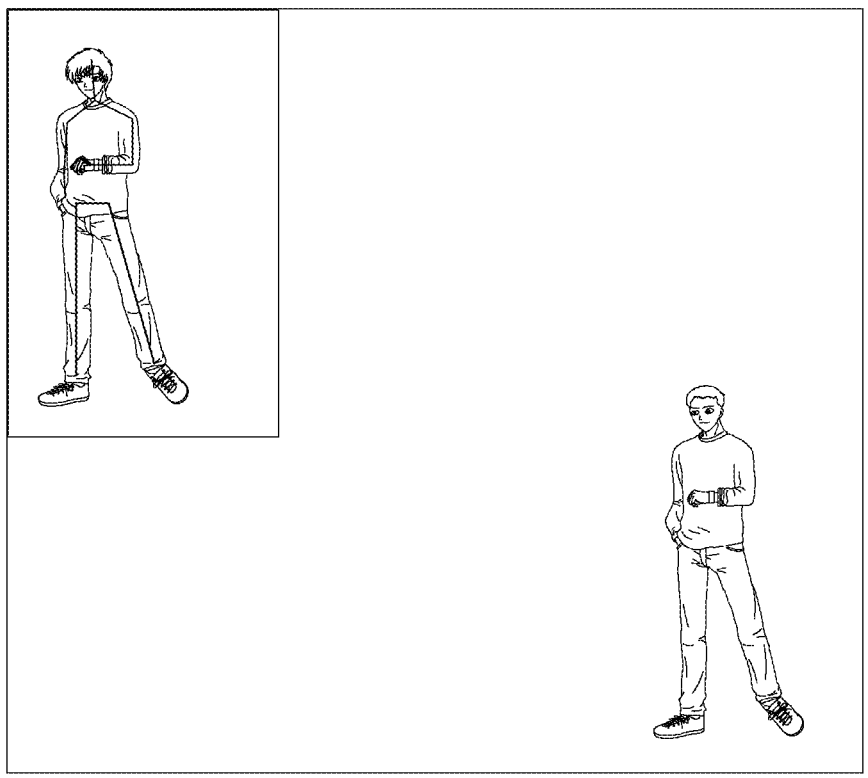
FIG. 5A to FIG. 5C are schematic diagrams of a controlled model simulating acquired changes in foot movement of a user provided by embodiments of the present disclosure.
Figure 5B:
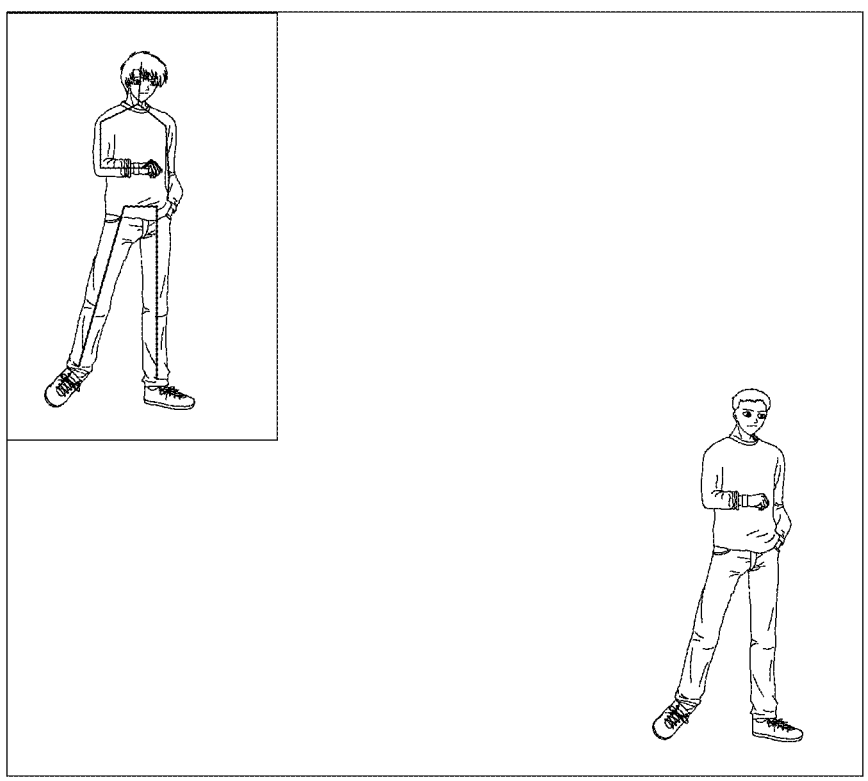
Figure 5C:
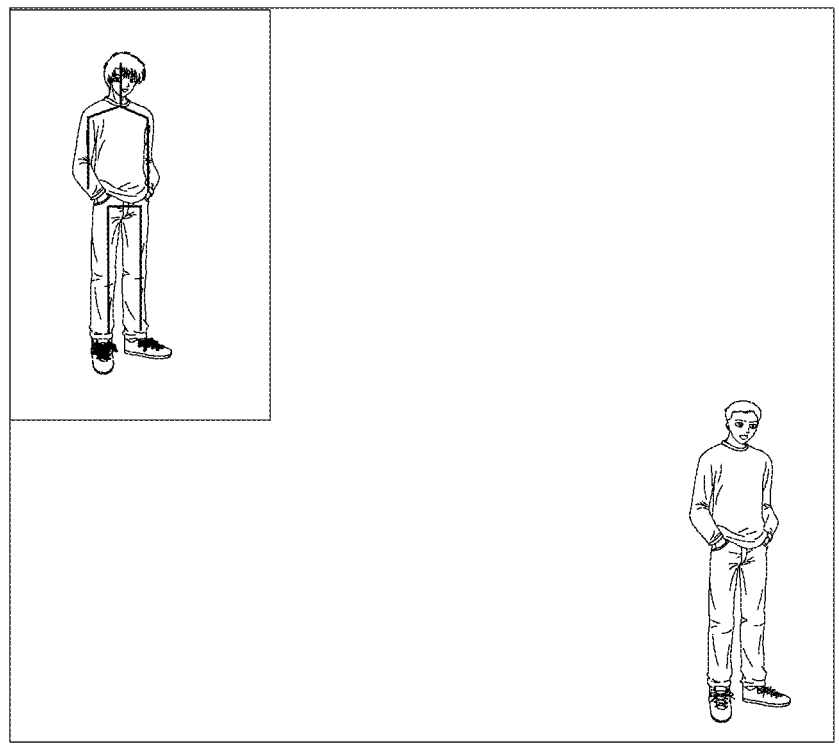

As shown in FIGS. 5A, 5B, and 5C, the small image in the upper left corner of the image is an acquired image, and in the lower right corner is the controlled model of the human body. From FIGS. 5A to 5C, the user takes a step to the right of the image, takes a step to the left of the image, and finally stands upright, and the controlled model also simulates the user's foot movements.

In addition, in FIGS. 4A to 4C, the controlled model also simulates the user's expression changes.

Figure 6:
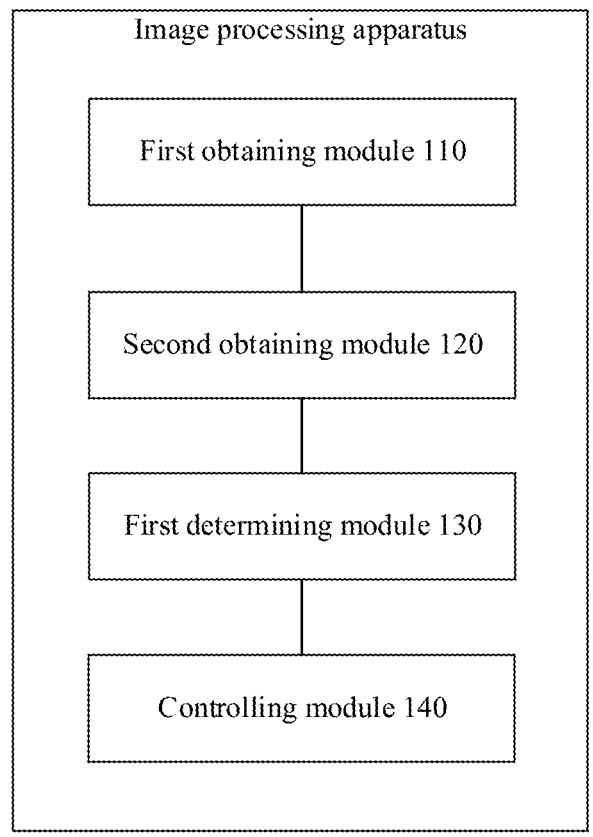
FIG. 6 is a schematic structural diagram of an image processing apparatus provided by embodiments of the present disclosure.

As shown in FIG. 6, the embodiments provide an image processing apparatus, including the following modules.

A first obtaining module 110 is configured to obtain an image.

A second obtaining module 120 is configured to obtain first rotation information of each of multiple nodes of a target based on the image.

A first determining module 130 is configured to determine second rotation information of each child node with respect to its parent node in the multiple nodes of the target according to a hierarchical relationship among the nodes and the multiple pieces of first rotation information.

A controlling module 140 is configured to control movements of nodes in a controlled model corresponding to the multiple nodes based on the multiple pieces of second rotation information.

In some embodiments, the first obtaining module 110, the second obtaining module 120, the first determining module 130, and the controlling module 140 may be program modules. After being executed by a processor, the program modules implement corresponding functions.

In some other embodiments, the first obtaining module 110, the second obtaining module 120, the first determining module 130, and the controlling module 140 may be software and hardware combined modules, and the software and hardware combined modules include, but are not limited to, programmable arrays. The programmable arrays include, but are not limited to, complex programmable arrays or field programmable arrays.

In still some other embodiments, the first obtaining module 110, the second obtaining module 120, the first determining module 130, and the controlling module 140 may be pure hardware modules, and the pure hardware modules include, but are not limited to, application-specific integrated circuits.

In some embodiments, the first obtaining module 110 is specifically configured to obtain the first rotation information of each of the multiple nodes of the target in a camera coordinate system based on the image.

In some embodiments, the first determining module 130 is specifically configured to: for each of the multiple nodes, take the node as a child node; and determine the second rotation information in a local coordinate system where the child node is located with respect to a local coordinate system where a parent node of the child node is located according to the hierarchical relationship and the multiple pieces of first rotation information.

In some embodiments, the apparatus further includes: a second determining module, configured to determine, for each of the multiple nodes, a local coordinate system where the node is located according to the hierarchical relationship.

In some embodiments, the second determining module is specifically configured to: take the node as a child node; take a direction in which the child node points to a parent node of the child node as a first direction of the local coordinate system according to the hierarchical relationship; take a perpendicular direction of a plane where the child node and two nodes connected to the child node are located as a second direction of the local coordinate system; and take an orientation of a predetermined part of the target as a third direction of the local coordinate system.

In some embodiments, the second obtaining module 120 is specifically configured to obtain a first quaternion of each of the multiple nodes of the target in the camera coordinate system based on the image.

In some embodiments, the first determining module 130 is specifically configured to: take each of the multiple nodes as a child node and determine a parent node of the child node according to the hierarchical relationship; and for each child node, determine a second quaternion of the child node with respect to the parent node based on the first quaternion of the parent node of the child node in the camera coordinate system and the first quaternion of the child node in the camera coordinate system.

In some embodiments, the apparatus further includes: a third determining module, configured to determine, for each piece of second rotation information, whether the second rotation information satisfies a constraint condition; and the controlling module 140 is specifically configured to: if the second rotation information satisfies the constraint condition, control a movement of a node in the controlled model corresponding to a child node associated with the second rotation information according to the second rotation information.

In some embodiments, the third determining module is specifically configured to: convert the second rotation information into a first angle in a coordinate system with a predetermined type; determine whether the first angle is within a preset angle range; and if the first angle is within the preset angle range, determine that the second rotation information satisfies the constraint condition.

In some embodiments, the apparatus further includes: a further determining module, configured to determine that the second rotation information does not satisfy the constraint condition if the first angle is outside the preset angle range.

In some embodiments, the apparatus further includes: a first correcting module, configured to correct the second rotation information to obtain third rotation information if the second rotation information does not satisfy the constraint condition; and the controlling module 140 is further configured to control a movement of a node in the controlled model corresponding to a child node associated with the second rotation information according to the third rotation information.

In some embodiments, the correcting module is specifically configured to: if the first angle corresponding to the second rotation information is outside the preset angle range, correct the first angle according to a preset angle to obtain a second angle; and obtain the third rotation information according to the second angle.

In some embodiments, the coordinate system with the predetermined type is an Eulerian coordinate system.

In some embodiments, the controlling module 140 is specifically configured to: perform posture defect correction on the multiple pieces of second rotation information or the multiple pieces of third rotation information generated from the multiple pieces of second rotation information to respectively obtain multiple corrected fourth rotation information; and control the movements of the nodes in the controlled model corresponding to the multiple nodes by using the multiple pieces of fourth rotation information.

In some embodiments, the posture defect correction includes at least one of the following: an ipsilateral defect of upper and lower limbs; a bowleg movement defect; a splayfoot movement defect; or a pigeon-toe movement defect.

In some embodiments, the apparatus further includes: a third obtaining module, configured to obtain a posture defect correction parameter according to difference information between a body form of the target and a standard body form, where the posture defect correction parameter is used for correcting the multiple pieces of second rotation information or the multiple pieces of third rotation information.

In some embodiments, the apparatus further includes: a second correcting module, configured to correct proportions of different parts of a standard model according to a proportional relationship among different parts of the target to obtain a corrected controlled model.

By combining any of the foregoing embodiments, several specific examples are provided as follows.

Example 1

This example provides an image processing method, the steps of which are as follows. An image is acquired, where the image includes a target, and the target includes but is not limited to a human body; face nodes of the human body are detected, where the face nodes may be contour nodes on the surface of the human face; and torso nodes and/or limb nodes of the human body are detected, where the torso nodes and/or the limb nodes here may all be 3D nodes and are represented by 3D coordinates, the 3D coordinates may be 3D coordinates obtained by detecting 2D coordinates from a 2D image and then using a conversion algorithm from the 2D coordinates to 3D coordinates, or the 3D coordinates may be 3D coordinates extracted from a 3D image acquired by a 3D camera.

The limb nodes here may include: upper limb nodes and/or lower limb nodes. For example, taking the hand as an example, hand nodes of the upper limb nodes include, but are not limited to, a wrist joint node, metacarpophalangeal joint nodes, knuckle joint nodes, and fingertip nodes. The positions of these nodes can reflect movements of the hand and fingers.

Mesh information of the human face is generated according to the face nodes. An expression basis corresponding to the current expression of the target is selected according to the mesh information, and the expression of the controlled model is controlled according to the expression basis; and the expression intensity of the controlled model corresponding to each expression basis is controlled according to an intensity coefficient reflected by the mesh information.

Quaternions are converted according to the torso nodes and/or the limb nodes. A torso movement of the controlled model is controlled according to quaternions corresponding to the torso nodes; and/or a limb movement of the controlled model is controlled according to quaternions corresponding to the limb nodes.

For example, the face nodes may include 106 nodes. The torso nodes and/or the limb nodes may include 14 nodes or 17 nodes, specifically as shown in FIG. 7A and FIG. 7B. FIG. 7A is a schematic diagram including 14 skeleton nodes. FIG. 7B is a schematic diagram including 17 skeleton nodes.

FIG. 7B may be a schematic diagram including 17 nodes generated based on the 14 nodes shown in FIG. 7A. The 17 nodes in FIG. 7B are equivalent to the nodes shown in FIG. 7A with the addition of node 0, node 7, and node 9. The 2D coordinates of node 9 may be preliminarily determined based on the 2D coordinates of node 8 and node 10; the 2D coordinates of node 7 may be determined according to the 2D coordinates of node 8 and the 2D coordinates of node 0. Node 0 may be a reference point provided by the embodiments of the present disclosure, and the reference point may serve as the foregoing first reference point and/or second reference point.

In this example, the controlled model may be a game character in a game scenario, a teacher model in an online education video in an online teaching scenario, or a virtual anchor in a virtual webcasting scenario. In short, the controlled model is determined according to the application scenario. The models and/or appearances of the controlled model are different in different application scenarios.

For example, in a conventional platform teaching scenario, such as mathematics, physics, or the like, the clothes of the teacher model may be relatively formal, such as a suit. For another example, in a sports teaching scenario such as yoga or gymnastics, the clothes of the controlled model may be sportswear.

Example 2

This example provides an image processing method, the steps of which are as follows. An image is acquired, where the image includes a target, and the target includes but is not limited to a human body. Torso key points and limb key points of the human body are detected, where the torso key points and/or the limb key points here may all be 3D key points and are represented by 3D coordinates. The 3D coordinates may be 3D coordinates obtained by detecting 2D coordinates from a 2D image and then using a conversion algorithm from the 2D coordinates to 3D coordinates. Or the 3D coordinates may be 3D coordinates extracted from a 3D image acquired by a 3D camera. The limb key points here may include: upper limb key points and/or lower limb key points. Taking the hand as an example, hand key points of the upper limb key points include, but are not limited to, a wrist joint key point, metacarpophalangeal joint key points, knuckle joint key points, and fingertip key points. The positions of these key points can reflect movements of the hand and fingers. Torso nodes are converted into quaternions that represent a torso movement, where the quaternions may be called torso quaternions; and limb nodes are converted into quaternions that represent a limb movement, where the quaternion may be called limb quaternions. A torso movement of the controlled model is controlled by the torso quaternions; and a limb movement of the controlled model is controlled by the limb quaternions.

The torso nodes and the limb nodes may include 14 nodes or 17 nodes, specifically as shown in FIG. 7A and FIG. 7B.

In this example, the controlled model may be a game character in a game scenario, a teacher model in an online education video in an online teaching scenario, or a virtual anchor in a virtual webcasting scenario. In short, the controlled model is determined according to the application scenario. The models and/or appearances of the controlled model are different in different application scenarios.

For example, in a conventional platform teaching scenario, such as mathematics, physics, or the like, the clothes of the teacher model may be relatively formal, such as a suit. For another example, in a sports teaching scenario such as yoga or gymnastics, the clothes of the controlled model may be sportswear.

Example 3

This example provides an image processing method, the steps of which are as follows. An image is obtained, where the image includes a target, and the target may be a human body. A 3D posture of the target in a 3D space is obtained according to the image, where the 3D posture may be represented by 3D coordinates of skeleton nodes of the human body. Absolute rotation information of joints of the human body in a camera coordinate system are obtained, where the absolute rotation positions may be determined by coordinates in the camera coordinate system. Coordinate directions of the joints are obtained according to the coordinates. Relative rotation parameters of the joints are determined according to a hierarchical relationship. Determining the relative parameters may specifically include: determining the positions of key points of the joints with respect to a root node of the human body. The relative rotation parameters may be represented by quaternions. The hierarchical relationship here may be a driving relationship between the joints. For example, the movement of the elbow joint may drive the movement of the wrist joint to some extent, the movement of the shoulder joint may also drive the movement of the elbow joint, or the like. The hierarchical relationship may also be predetermined according to the joints of the human body. The rotation of the controlled model is controlled by the quaternions.

A further image processing method further includes: converting the quaternions into first Euler angles; transforming the first Euler angles to obtain second Euler angles within a constraint condition, where the constraint condition may be used for limiting the first Euler angles; and obtaining quaternions corresponding to the second Euler angles, and then controlling the rotation of the controlled model by using the quaternions. Obtaining the quaternions corresponding to the second Euler angles may include directly converting the second Euler angles into quaternions.

Another further image processing method further includes: performing posture optimization adjustment on the second Euler angles, for example, adjusting some of the second Euler angles into posture-optimized Euler angles based on a preset rule so as to obtain third Euler angles. Then, obtaining the quaternions corresponding to the second Euler angles may include: converting the third Euler angles into quaternions for controlling the controlled model.

Still another further image processing method further includes: after converting the second Euler angles into quaternions, performing posture optimization processing on the quaternion obtained after the conversion, for example, performing adjustment based on a preset rule to obtain adjusted quaternions and controlling the controlled model according to the finally adjusted quaternions.

In some embodiments, the second Euler angles or the quaternions obtained by conversion from the second Euler angles may be adjusted based on a preset rule, or automatically optimized and adjusted by a deep learning model. There are a variety of specific implementations, which is not limited in the present application.

In addition, still another image processing method may further include pre-processing. For example, according to the size of the acquired human body, the hip width and/or the shoulder width of the controlled model are modified to correct the overall posture of the human body. Upright standing correction and stomach lifting correction may be performed on the standing posture of the human body. Some persons may lift their stomachs when they stand, and the stomach lifting correction enables the controlled model not to simulate the user's stomach lifting action. Some persons may stoop when they stand, and stooping correction enables the controlled model not to simulate the user's stooping action or the like.

Example 4

This example provides an image processing method, the steps of which are as follows. An image is obtained, where the image includes a target, and the target may include at least one of a human body, a human upper limb, and a human lower limb. A coordinate system of a target joint is obtained according to position information of the target joint in an image coordinate system. According to position information of a limb part in the image coordinate system, a coordinate system of the limb part that may drive the target joint to move is obtained. Rotation of the target joint with respect to the limb part is determined based on the coordinate system of the target joint and the coordinate system of the limb part, to obtain rotation information, where the rotation information includes a self-rotation parameter of the target joint and information of rotation driven by the limb part. The information of rotation driven by the limb part is limited by first angle limitation to obtain a final driven rotation parameter. Rotation information of the limb part is corrected according to the final driven rotation information. Relative rotation information is obtained according to the coordinate system of the limb part and the corrected rotation information of the limb part. Second angle limitation is performed on the relative rotation information to obtain limited relative rotation information. A quaternion is obtained based on the limited rotation information. A movement of the target joint of the controlled model is controlled according to the quaternion.

For example, if a human upper limb is processed, a coordinate system of the hand in the image coordinate system is obtained, and a coordinate system of the forearm and a coordinate system of the upper arm are obtained. In this case, the target joint is the wrist joint. Rotation of the hand with respect to the forearm is decomposed into self-rotation and driven rotation. The driven rotation is transferred to the forearm, specifically, for example, the driven rotation is assigned to rotation of the forearm in a corresponding direction; and the maximum rotation of the forearm is limited by first angle limitation of the forearm. Then, the rotation of the hand with respect to the corrected forearm is determined to obtain a relative rotation parameter. Second angle limitation is performed on the relative rotation parameter to obtain the rotation of the hand with respect to the forearm.

If a human lower limb is processed, a coordinate system of the foot in the image coordinate system is obtained, and a coordinate system of the crus and a coordinate system of the thigh are obtained. In this case, the target joint is the ankle joint. Rotation of the foot with respect to the crus is decomposed into self-rotation and driven rotation. The driven rotation is transferred to the crus, specifically, for example, the driven rotation is assigned to rotation of the crus in a corresponding direction; and the maximum rotation of the crus is limited by first angle limitation of the crus. Then, the rotation of the foot with respect to the corrected crus is determined to obtain a relative rotation parameter. Second angle limitation is performed on the relative rotation parameter to obtain the rotation of the foot with respect to the crus.

Example 5

This example provides a method for specifically calculating quaternions of the human skeleton.

It should be noted that information of the human skeleton is less than quaternions, because each bone is capable of self-rotation. As shown in FIG. 8A, A and B are two nodes in space, representing the start and end of a bone. However, the posture of this bone in space cannot be determined, and thus, a local coordinate system of each bone is defined. As shown in FIG. 8B, after determining the local coordinate system, the posture of the bone in space is determined.

First, coordinates of 17 key points in an image coordinate system may be obtained by detecting key points of joints of a human body in an image to obtain a human skeleton, which is defined as $S=\{(x_1,y_1,z_1), \ldots, (x_{17}, y_{17}, z_{17})\}$. There is a total of 17 3D coordinates, and the meaning represented by each point is as shown in FIG. 2. It should be noted that in FIG. 2, two nodes, namely node 8 and node 15, are additionally provided at positions corresponding to the left and right hands.

In order to drive a 3D animated character (that is, the above controlled model), it is not enough to just know these, and it is necessary to migrate this human skeleton to a human skeleton in a 3DMAX standard. The human skeleton of the controlled model includes quaternions of local rotation information, and local bone lengths. The bone lengths are expressed by end point coordinates in local coordinate systems. Because the bone lengths of the controlled model are generally set, only calculation of quaternions representing local rotation information is considered.

As shown in FIG. 2, the skeleton of the controlled model has 19 nodes, and is defined as $A=\{(p_0,q_0), \ldots, (p_{18},q_{18})\}$. $p_i$ indicates 3D coordinates of node i in a local coordinate system, is generally a fixed value carried by an original model, and is not required to be modified or migrated. $q_i$ is a quaternion, indicates rotation of a bone controlled by node i in a coordinate system of its parent node, and may also be regarded as rotation of the local coordinate system of the current node and the local coordinate system of the parent node.

Except for the four nodes (8, 15, 11, and 18) that control the hands and feet, the other nodes may be calculated using the existing human skeleton and human a priori knowledge. To facilitate the calculation, first a rotation quaternion of each node with respect to a camera coordinate system is calculated: $\{Q_0, Q_1, \ldots, Q_{18}\}$, and then a rotation quaternion of each node with respect to its parent node is calculated:

$$q_i = Q_{parent(i)}^{-1} \cdot Q_i$$

The parent key point parent(i) is a key point at an upper layer of the current key point i, $Q_i$ is a rotation quaternion of the current key point i with respect to the camera coordinate system, and $Q_{parent(i)}^{-1}$ is a counter rotation parameter of the key point at the upper layer. For example, $Q_{parent(i)}$ is a rotation parameter of the key point at the upper layer, and the rotation angle is 90 degrees; and then the rotation angle of $Q_{parent(i)}^{-1}$ is −90 degrees.

In order to calculate a quaternion of each joint, directions of coordinate axes of a local coordinate system of each node need to be determined. Without loss of generality, it is specified that: for each bone, a direction in which a child node points to its parent node is the x-axis; an axis of rotation that maximizes the rotation angle of the bone is taken as the z-axis; and if the axis of rotation cannot be determined, a direction facing the human body is taken as the y-axis. As shown in FIG. 9, 17 skeletons determine 19 nodes of a controlled model. A local coordinate system of each node is shown in the following table.

| Node numbers in a 19-node skeleton | Calculation by 17 nodes |
|---|---|
| 0 | Take (1-7) × (1-4) as a y-axis, and (7-0) as an x-axis |
| 1 | Take maximum default values of 3D coordinates |
| 2 | Take (14-11) × (14-7) as a y-axis, and (8-7) as an x-axis |
| 3 | Take maximum default values of 3D coordinates |
| 4 | Take (10-8) as an x-axis, and (9-10) × (9-8) as a z-axis |
| 5 | Take (11-8) as an x-axis, and (12-11) × (11-8) as a y-axis |
| 6 | Take (12-11) as an x-axis, and (11-12) × (12-13) as a z-axis |
| 7 | Take (13-12) as an x-axis, and (11-12) × (12-13) as a z-axis. Note: the node changes after a quaternion of the hand is subsequently added. |
| 9 | Take (5-4) as an x-axis, and (5-6) × (5-4) as a z-axis |
| 10 | Take (6-5) as an x-axis, and (5-6) × (5-4) as a z-axis |
| 12 | Take (14-8) as an x-axis, and (8-14) × (14-15) as a y-axis |
| 13 | Take (15-14) as an x-axis, and (14-15) × (15-16) as a z-axis |
| 14 | Take (16-15) as an x-axis, and (14-15) × (15-16) as a z-axis. Note: the node changes after a quaternion of the hand is subsequently added. |
| 16 | Take (2-1) as an x-axis, and (2-3) × (2-1) as a z-axis |
| 17 | Take (3-2) as an x-axis, and (2-3) × (2-1) as a z-axis |

(i-j) indicates a vector from i to j, and x indicates cross-multiplication. For example, (1-7) indicates a vector from node 1 to node 7.

In the above table, nodes 8, 15, 11, and 18 are four nodes of the hands and feet. Because calculation of quaternions of the four nodes requires to be determined by using a specific posture, this table does not include the 4 key points. In addition, in the above table, the node numbers of the 19-node skeleton may be seen in FIG. 2 and the node numbers of the 17-node skeleton may be seen in FIG. 7B.

Figure 10:
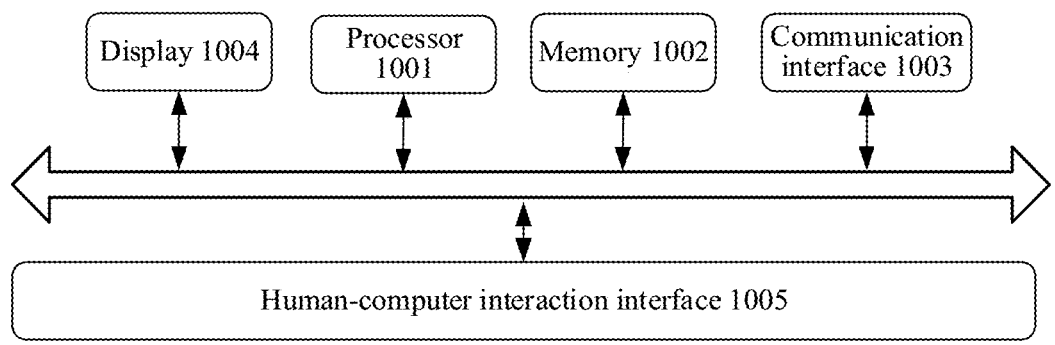
FIG. 10 is a schematic structural diagram of an image device provided by embodiments of the present disclosure.

As shown in FIG. 10, the embodiments of the present application provide an image device, including: a memory 1002 configured to store information; and a processor 1001 connected to the memory 1002 and configured to implement, by executing computer executable instructions stored on the memory 1002, the image processing method provided by one or more of the foregoing technical solutions, for example, the image processing method shown in FIG. 1.

The memory 1002 may be various types of memory, such as a random-access memory, a Read-Only Memory (ROM), and a flash memory. The memory 1002 may be used for information storage, for example, storing computer executable instructions or the like. The computer executable instructions may be various program instructions, such as target program instructions and/or source program instructions.

The processor 1001 may be various types of processor, such as a central processing unit, a microprocessor, a digital signal processor, a programmable array, a digital signal processor, an application-specific integrated circuit, or a graphic processing unit.

The processor 1001 may be connected to the memory 1002 by means of a bus. The bus may be an integrated circuit bus or the like.

In some embodiments, the terminal device may further include: a communication interface 1003, and the communication interface 1003 may include: a network interface such as a local area network interface and a transceiver antenna. The communication interface is also connected to the processor 1001 and may be used for information transmission and reception.

In some embodiments, the terminal device further includes a human-computer interaction interface 1005. For example, the human-computer interaction interface 1005 may include various input/output devices such as a keyboard and a touch screen.

In some embodiments, the image device further includes: a display 1004 which may display various prompts, acquired face images, and/or various interfaces.

The embodiments of the present application provide a non-volatile computer storage medium. The computer storage medium stores a computer executable code. After the computer executable code is executed, the image processing method provided by one or more of the foregoing technical solutions, for example, the image processing method shown in FIG. 1, can be implemented.

It should be understood that the disclosed device and method in several embodiments provided in the present application may be implemented in other modes. The device embodiments described above are merely exemplary. For example, the unit division is merely logical function division and may be actually implemented in other division manners. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be electrical, mechanical, or in other forms.

The units described as separate components may or may not be physically separate, and the components displayed as units may or may not be physical units, i.e., may be located at one position, or may be distributed on a plurality of network units. Some or all of the units may be selected according to actual needs to achieve the objectives of the solutions of the embodiments.

In addition, the functional units in the embodiments of the present disclosure may be all integrated into one processing module, or each of the units may respectively serve as an independent unit, or two or more units are integrated into one unit, and the integrated unit may be implemented in the form of hardware, or may also be implemented in the form of a hardware and software function unit.

A person of ordinary skill in the art may understand that all or some steps for implementing the foregoing method embodiments may be completed by a program by instructing related hardware; the foregoing program may be stored in a computer readable storage medium; when the program is executed, steps including the foregoing method embodiments are performed. Moreover, the foregoing non-volatile storage medium includes various media capable of storing a program code, such as a mobile storage device, a ROM, a magnetic disk, or an optical disk.

The descriptions above are only specific implementations of the present disclosure. However, the scope of protection of the present disclosure is not limited thereto. Within the technical scope disclosed by the present disclosure, any variation or substitution that can be easily conceived of by those skilled in the art should all fall within the scope of protection of the present disclosure. Therefore, the scope of protection of the present disclosure should be determined by the scope of protection of the appended claims.

The invention claimed is:

1. An image processing method, comprising:
obtaining an image;
obtaining first rotation information of each of a plurality of nodes of a target based on the image;
determining, according to a hierarchical relationship among the nodes and a plurality of pieces of the first rotation information, second rotation information of each child node with respect to a parent node in the plurality of nodes of the target; and
controlling movements of nodes in a controlled model corresponding to the plurality of nodes based on a plurality of pieces of the second rotation information,
wherein controlling the movements of the nodes in the controlled model corresponding to the plurality of nodes based on the plurality of pieces of second rotation information comprises:
obtaining a plurality of pieces of fourth rotation information, respectively, by performing posture defect correction on the plurality of pieces of second rotation information or on a plurality of pieces of third rotation information generated by the plurality of pieces of second rotation information; and
controlling the movements of the nodes in the controlled model corresponding to the plurality of nodes by using the plurality of pieces of the fourth rotation information.

2. The method according to claim 1, wherein obtaining the first rotation information of each of the plurality of nodes of the target based on the image comprises:
obtaining the first rotation information of each of the plurality of nodes of the target in a camera coordinate system based on the image.

3. The method according to claim 2, wherein determining, according to the hierarchical relationship among the nodes and the plurality of pieces of first rotation information, the second rotation information of each child node with respect to the parent node in the plurality of nodes of the target comprises:
for each of the plurality of nodes,
taking the node as a child node; and
determining, according to the hierarchical relationship and the plurality of pieces of first rotation information, the second rotation information in a local coordinate system where the child node is located with respect to a local coordinate system where a parent node of the child node is located.

4. The method according to claim 3, further comprising:
determining, for each of the plurality of nodes, a local coordinate system where the node is located according to the hierarchical relationship.

5. The method according to claim 4, wherein determining the local coordinate system where the node is located according to the hierarchical relationship comprises:
taking the node as a child node;
taking a direction in which the child node points to a parent node of the child node as a first direction of the local coordinate system according to the hierarchical relationship;
taking a perpendicular direction of a plane where the child node and two nodes connected to the child node are located as a second direction of the local coordinate system; and
taking an orientation of a predetermined part of the target as a third direction of the local coordinate system.

6. The method according to claim 2, wherein obtaining the first rotation information of each of the plurality of nodes of the target in the camera coordinate system based on the image comprises:
obtaining a first quaternion of each of the plurality of nodes of the target in the camera coordinate system based on the image.

7. The method according to claim 2, wherein determining, according to the hierarchical relationship among the nodes and the plurality of pieces of first rotation information, the second rotation information of each child node with respect to the parent node in the plurality of nodes of the target comprises:
taking each of the plurality of nodes as a child node and determining a parent node of the child node according to the hierarchical relationship; and
for each child node, determining a second quaternion of the child node with respect to the parent node of the child node based on a first quaternion of the parent node of the child node in the camera coordinate system and a first quaternion of the child node in the camera coordinate system.

8. The method according to claim 1, wherein controlling the movements of the nodes in the controlled model corresponding to the plurality of nodes based on the plurality of pieces of second rotation information comprises:
determining, for each piece of second rotation information, whether the second rotation information satisfies a constraint condition; and
in response to that the second rotation information satisfies the constraint condition, according to the second rotation information, controlling a movement of a node in the controlled model corresponding to a child node associated with the second rotation information.

9. The method according to claim 8, wherein determining, for each piece of second rotation information, whether the second rotation information satisfies the constraint condition comprises:
converting the second rotation information into a first angle in a coordinate system with a predetermined type;
determining whether the first angle is within a preset angle range; and
in response to that the first angle is within the preset angle range, determining that the second rotation information satisfies the constraint condition.

10. The method according to claim 9, further comprising:
determining that the second rotation information does not satisfy the constraint condition in response to that the first angle is outside the preset angle range.

11. The method according to claim 9, wherein the coordinate system with the predetermined type is an Eulerian coordinate system.

12. The method according to claim 8, further comprising:
in response to that the second rotation information does not satisfy the constraint condition,
obtaining, by correcting the second rotation information, the third rotation information; and
controlling, according to the third rotation information, the movement of the node in the controlled model corresponding to the child node associated with the second rotation information.

13. The method according to claim 12, wherein in response to that the second rotation information does not satisfy the constraint condition, obtaining, by correcting the second rotation information, the third rotation information comprises:
in response to that a first angle corresponding to the second rotation information is outside a preset angle range, obtaining, by correcting the first angle according to the preset angle, a second angle; and
obtaining the third rotation information according to the second angle.

14. The method according to claim 1, wherein the posture defect correction comprises correction of at least one of:
an ipsilateral defect of upper and lower limbs;
a bowleg movement defect;
a splayfoot movement defect; or
a pigeon-toe movement defect.

15. The method according to claim 1, further comprising:
obtaining a posture defect correction parameter according to difference information between a body form of the target and a standard body form, wherein the posture defect correction parameter is used for correcting the plurality of pieces of second rotation information or the plurality of pieces of third rotation information.

16. The method according to claim 1, further comprising:
obtaining, by correcting proportions of different parts of a standard model according to a proportional relationship among different parts of the target, a corrected controlled model.

17. The method according to claim 1, further comprising:
detecting face nodes of a face of the target;
generating mesh information of the face according to the face nodes;
determining an expression basis corresponding to a current expression of the target according to the mesh information; and
controlling an expression of the controlled model according to the expression basis.

18. The method according to claim 17, further comprising:
controlling an expression intensity of the controlled model corresponding to each expression basis according to an intensity coefficient reflected by the mesh information.

19. An image device, comprising:
a memory storing computer executable instructions; and
a processor coupled to the memory,
wherein the processor is configured to:
obtain an image;
obtain first rotation information of each of a plurality of nodes of a target based on the image;
determine, according to a hierarchical relationship among the nodes and a plurality of pieces of the first rotation information, second rotation information of each child node with respect to a parent node in the plurality of nodes of the target; and
control movements of nodes in a controlled model corresponding to the plurality of nodes based on a plurality of pieces of the second rotation information,
wherein controlling the movements of the nodes in the controlled model corresponding to the plurality of nodes based on the plurality of pieces of second rotation information comprises:
obtaining a plurality of pieces of fourth rotation information, respectively, by performing posture defect correction on the plurality of pieces of second rotation information or on a plurality of pieces of third rotation information generated by the plurality of pieces of second rotation information; and controlling the movements of the nodes in the controlled model corresponding to the plurality of nodes by using the plurality of pieces of the fourth rotation information.

20. The device according to claim 19, wherein obtaining the first rotation information of each of the plurality of nodes of the target based on the image comprises:

obtaining the first rotation information of each of the plurality of nodes of the target in a camera coordinate system based on the image.

21. A non-transitory computer storage medium storing computer executable instructions that are executed by a processor to:

obtain an image;

obtain first rotation information of each of a plurality of nodes of a target based on the image;

determine, according to a hierarchical relationship among the nodes and a plurality of pieces of the first rotation information, second rotation information of each child node with respect to a parent node in the plurality of nodes of the target; and control movements of nodes in a controlled model corresponding to the plurality of nodes based on a plurality of pieces of the second rotation information, wherein controlling the movements of the nodes in the controlled model corresponding to the plurality of nodes based on the plurality of pieces of second rotation information comprises:

obtaining a plurality of pieces of fourth rotation information, respectively, by performing posture defect correction on the plurality of pieces of second rotation information or on a plurality of pieces of third rotation information generated by the plurality of pieces of second rotation information; and controlling the movements of the nodes in the controlled model corresponding to the plurality of nodes by using the plurality of pieces of the fourth rotation information.

\* \* \* \* \*